Dec. 12, 1967  M. D. HARTMAN, JR  3,357,054
THERMOFORMING APPARATUS

Filed Jan. 4, 1966  4 Sheets-Sheet 1

INVENTOR.
Maurice D. Hartman, Jr.
BY Robert K. Youtie
ATTORNEY

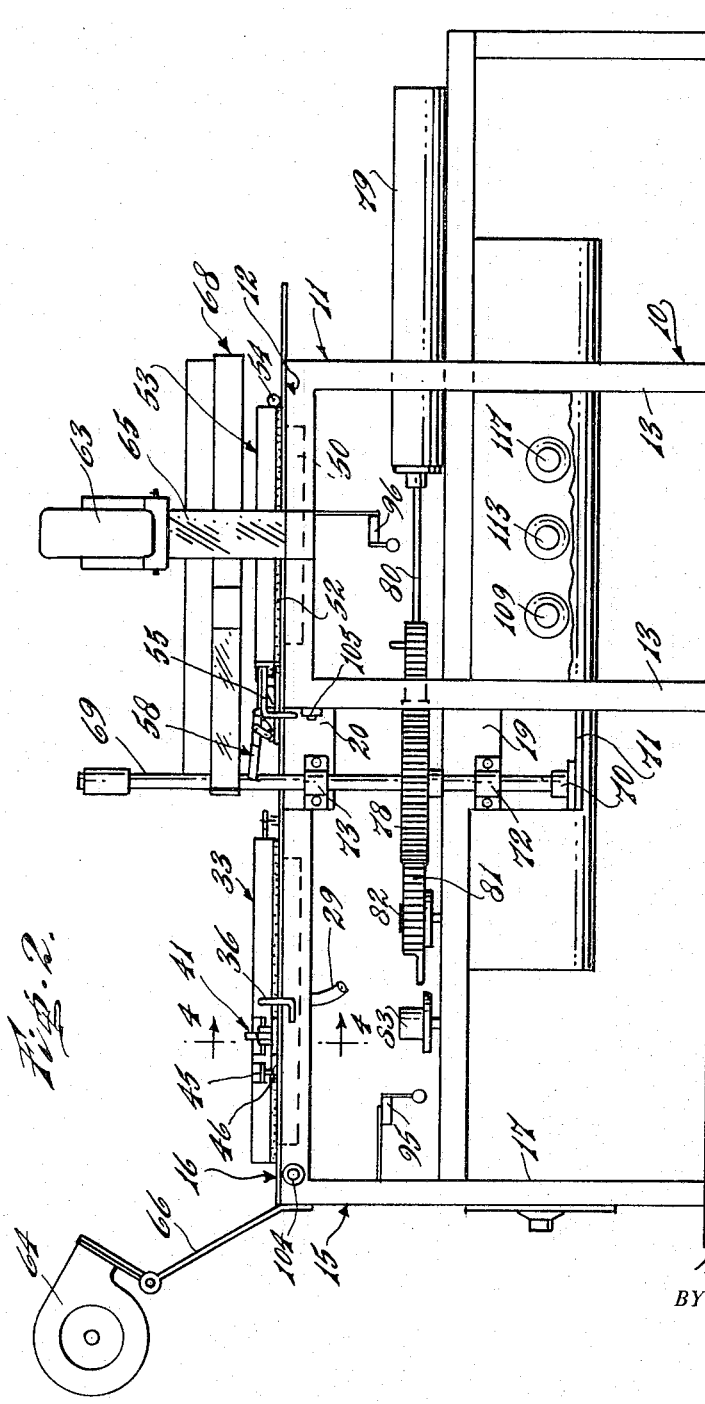

Dec. 12, 1967  M. D. HARTMAN, JR  3,357,054
THERMOFORMING APPARATUS
Filed Jan. 4, 1966  4 Sheets-Sheet 3
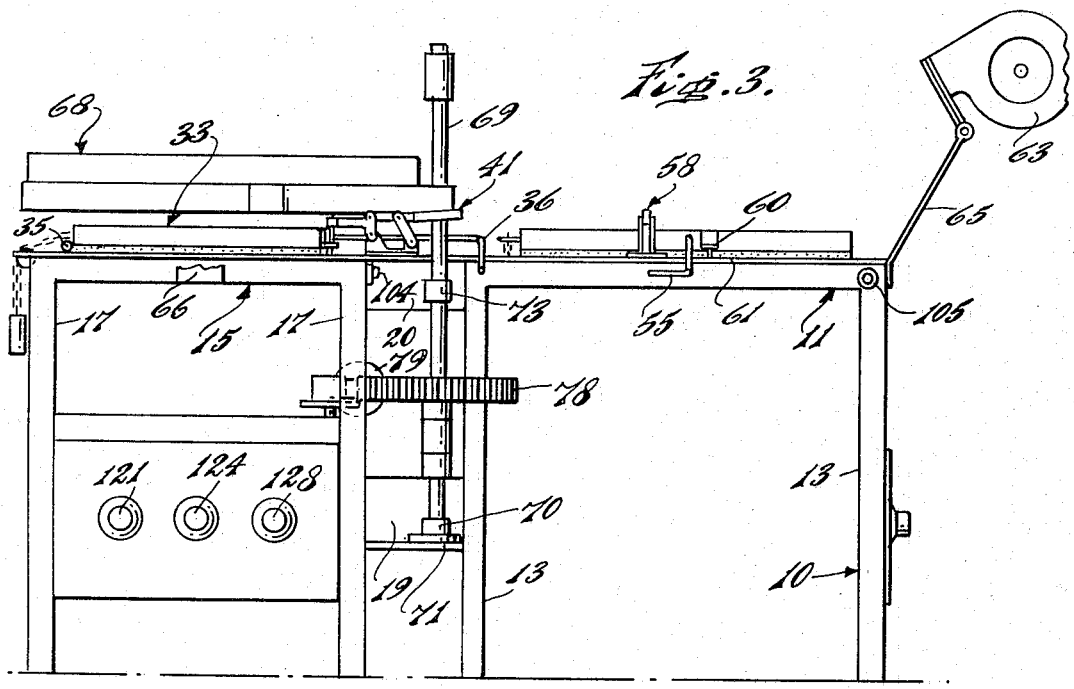
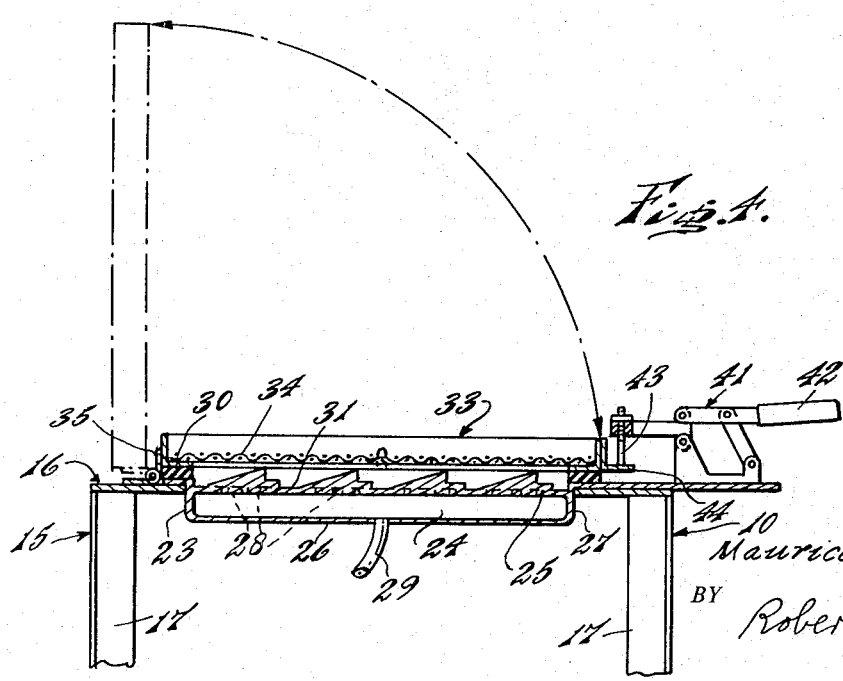
INVENTOR.
Maurice D. Hartman, Jr.
BY Robert K. Youtie
ATTORNEY

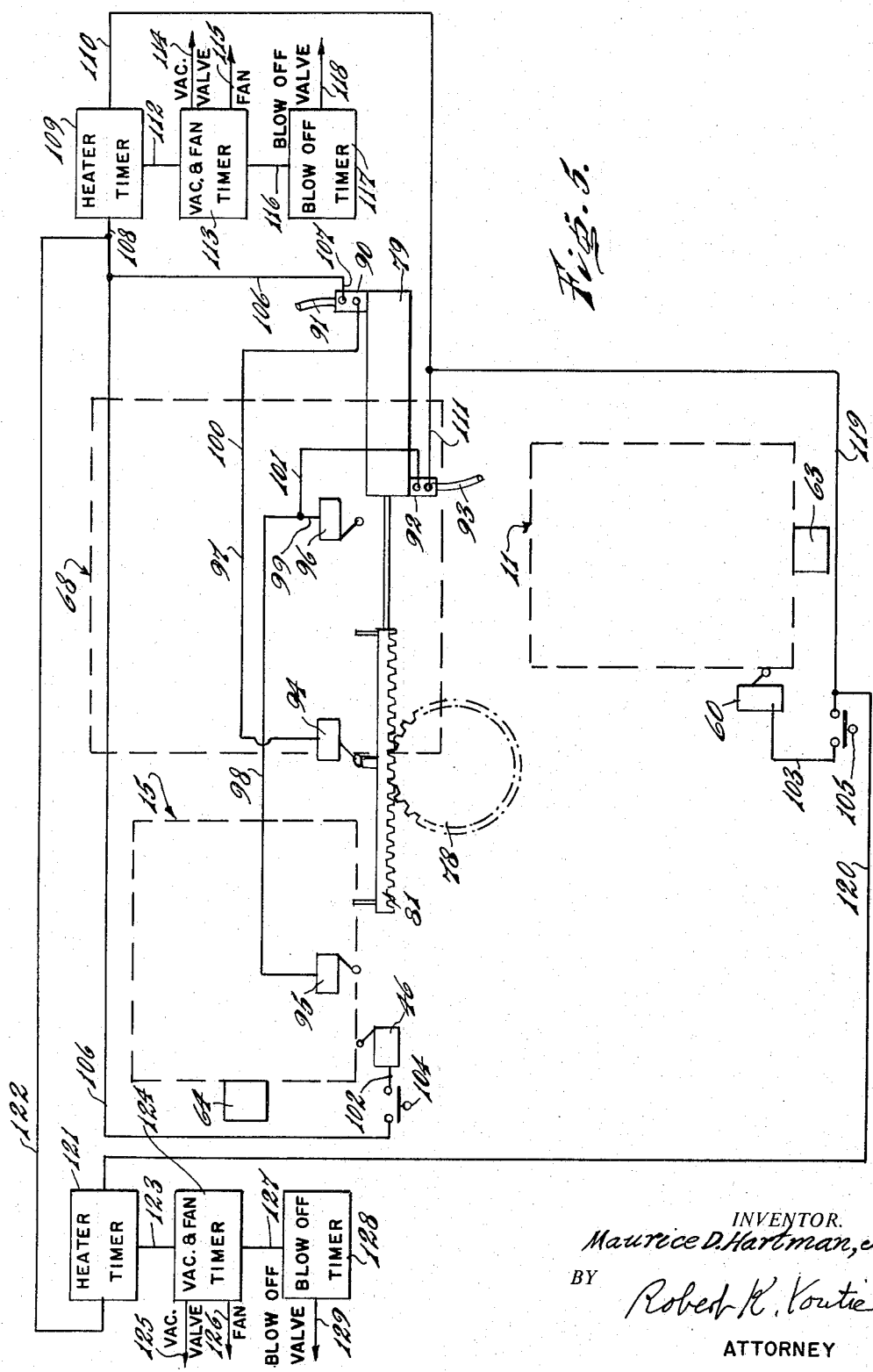

United States Patent Office 3,357,054
Patented Dec. 12, 1967

3,357,054
THERMOFORMING APPARATUS
Maurice D. Hartman, Jr., R.D. 1,
Harleysville, Pa. 19438
Filed Jan. 4, 1966, Ser. No. 518,642
7 Claims. (Cl. 18—19)

ABSTRACT OF THE DISCLOSURE

The instant invention is essentially concerned with relatively simple but high-speed thermoforming apparatus for operation by a single operator wherein a pair of molding stations are arranged in angularly spaced-apart relation for access thereto by an operator at a radially inward position with respect to the stations, and wherein a heater means is mounted for swinging movement along an arcuate path between the molding stations for alternate location at respective stations while the work is being removed and replaced at the other station.

---

This invention relates generally to thermoforming apparatus, and is especially concerned with a unique thermoforming apparatus for operation by a single operator.

While the device of the present invention has been primarily developed and employed for use in vacuum-forming, and will be illustrated and described hereinafter with particular reference thereto, it is appreciated that the advantageous features of the instant invention are equally applicable to other thermoforming techniques, such as pressure-forming, and the like.

As is well known to those versed in the art, thermoforming is essentially very simple, involving the heating of a thermoplastic sheet to a moldable condition, and moving the heated sheet into conforming engagement with the surface of a mold, whereupon the sheet cools and assumes the contour of the mold. While a variety of single-operator thermoforming machines have been proposed and used, these prior machines are subject to certain disadvantages, including relatively slow operation and low production rates, complex and unreliable mechanisms, and others.

Accordingly, it is a primary object of the present invention to provide a thermoforming apparatus for use by a single operator which is extremely easy to operate even by unskilled personnel, simple and durable in structure, entirely reliable throughout a long useful life, and which is capable of greatly increased rates of production.

It is still another object of the present invention to provide a thermoforming apparatus having the advantageous characteristics mentioned in the preceding paragraph, which is relatively inexpensive to manufacture, install and maintain, and which requires a minimum of floor space.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 2 is an elevational view of the apparatus of FIGURE 1, taken from the right-hand side thereof;

FIGURE 3 is an elevational view taken from the left-hand side of FIGURE 2;

FIGURE 4 is a partial sectional view taken generally along the line 4—4 of FIGURE 2; and FIGURE 5 is a diagrammatic representation of the controls of the instant apparatus.

Figure 1:
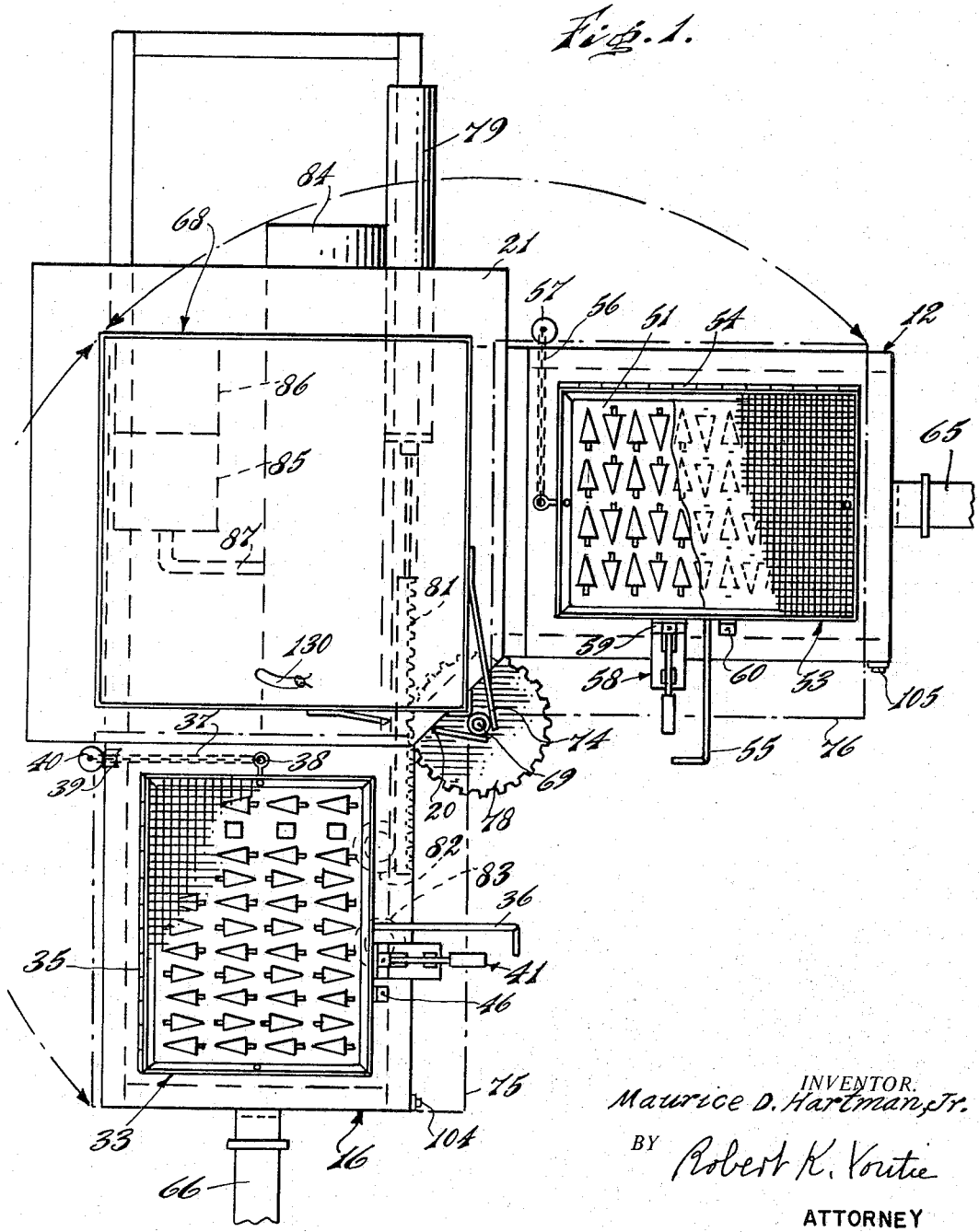
FIGURE 1 is a top plan view showing a thermoforming apparatus constructed in accordance with the teachings of the present invention, and partly broken away for increased clarity, the heater means being illustrated in dot-and-dash outline in alternate positions of movement.

Referring now more particularly to the drawings, and specifically to FIGURES 1–3 thereof, a frame is there generally designated 10 and is generally of right-angular over-all configuration, as viewed in plan. The frame includes a right station 11 comprising a generally horizontal, elevated bed 12, which may be of generally rectangular configuration, and supported in its elevated horizontal position by a plurality of ground-engageable depending legs 13.

Arranged in approximately 90 degree, angularly spaced-apart relationship with respect to the station 11 is a station 15, which also includes a generally horizontally disposed, elevated bed 16 of generally rectangular configuration and supported in its elevated position by a plurality of depending legs 17. The beds 12 and 16 of respective stations 11 and 15 are preferably generally coplanar or level with each other, and are preferably rigidly connected together by suitable structural members, such as lower and upper framepieces 19 and 20 rigidly connecting adjacent legs 17 and 13. Interposed between the angularly spaced stations 11 and 15 may be provided a generally horizontal heat-resistant member or plate 21, which may be arranged generally coplanar with the beds 12 and 16, and supported on any suitable structural members, such as extending from the beds. The plate 21 is thus located angularly intermediate the beds 16 and 12.

The beds 12 and 16 may be substantially identical in construction, so that a detailed description of one will suffice, it being obvious that the beds are spaced apart and oriented at approximately 90 degrees with respect to each other. In FIGURE 4 it is seen that the bed 16 may be provided with a central thru opening 23, which may be of generally rectangular-outline configuration centrally and occupying a greater part of the bed. Fixedly secured in the opening 23 is a relatively shallow pneumatic chamber 24 defined between generally parallel upper and lower walls 25 and 26, and a surrounding peripheral wall 27. The upper wall 25 may be generally flush with the bed 16 and provided with a plurality of thru holes or perforations 28. A pneumatic conduit 29 may be connected to the interior of chamber 24 for transferring air to and from the chamber, as will appear more fully hereinafter.

Surrounding the upper chamber wall 25, and at a level above that of the upper chamber wall, may be a generally rectangular resilient gasket or seal 30. A mold 31 is removably seated on the upper surface of upper chamber wall 25, within the gasket 30, and may be of the multiple type, as shown. The mold 31 is provided with thru apertures, in the conventional manner, for fluid communication through openings 28 with the chamber 24.

Superimposed on the gasket or seal 30 is a workholding frame, generally designated 33, and which may be of rectangular, centrally open configuration, substantially conforming to that of the gasket 30. The rectangular open frame 33 may be fabricated of angle stock, and provided with a reticulate sheet 34, if desired. Along one side of the frame 33 is provided a pivotal mounting or hinge 35 which is secured to the bed 16 by any suitable means, to mount the frame 33 for swinging movement, as between the solid and phantom positions shown in FIGURE 4. In particular, the pivotal mounting 35 of frame 33 is located on the radially outer side of the frame, with respect to the angular arrangement of stations 11 and 15, so as to be remote from a radially inner position of an operator. Extending from the radially inner side of the frame 33, radially inward therefrom may be an operating handle 36 conveniently located for manual operation by an operator to swing the frame between its raised and lowered positions. The operating handle 36 may be seen in FIGURE 2.

The frame 33 is advantageously counterbalanced, as by a chain 37 connected at one end by an eye 38 to one side of the frame at a location spaced from the pivotal mounting 35. The chain 37 may pass from the eye 38 over a suitable roller 39, and depend therefrom for connection to a suspended weight 40. The weight 40 is advantageously sufficient to normally maintain the frame 33 in its raised position.

In addition, there is mounted on the bed 16 adjacent to the frame 31, and on the radially inner side thereof for convenient access by an operator, a releasable frame clamp or holding means 41. The frame clamp 41 may be of any suitable type, such as the toggle type shown in the drawings, including a manually actuable handle 42 and an adjustable pin 43 engageable with a bracket 44 projecting from the frame for releasably clamping the frame in its lowered operative position over the mold 31. An additional bracket 45 may be carried by the radially inner side of the frame 33 for engagement with a switch 46 mounted on the bed 16 when the frame is in its lowered operative position. The switch 46 is an interlock between the frame and control means, as will appear hereinafter.

The station 11 is essentially identical to the station 15, the bed being provided with a shallow chamber 50 and adapted to receive an upwardly facing, generally horizontal mold 51 over the chamber. Surrounding the mold 51 may be a generally rectangular gasket or seal 52, and a frame, generally designated 53 is arranged on the bed 12 for swinging movement into and out of operative overlying relation with respect to the mold. The frame 53 is pivotally mounted on the bed 12, as by suitable pivot or hinge means 54 located on the radially outer side of the frame 53, with respect to the angular orientation of the stations. The frame 53 thus has its radially inner side swingable upwardly and downwardly about the axis of pivot means 52, and is provided on its radially inward side with a manually actuable operator or handle 55 extending radially inwardly from the frame for convenient manual access by an operator.

The frame 53 is advantageously counterbalanced, as by a chain 56 secured to the frame at a location spaced from the hinge 54, and suspending a weight 57 sufficient to raise the frame.

Mounted on the bed 12, adjacent to the radially inner side of the frame 53 when the latter is in its operative position, is a clamping or holding means 58, such as a toggle-type clamp releasably engageable with a bracket 59 carried by the radially inner side of the frame 53 to positively hold the frame down in its operative position. An additional bracket 60 is carried by the frame 53, on the radially inner side thereof, and engageable with an interlock switch 61 when the frame is down, for a purpose appearing presently.

Carried by each of the beds 12 and 16 is a blower or fan, respectively designated 63 and 64. The fan 64 is mounted at an elevation above that of the bed 12, by a suitable mounting bracket 65, and arranged with its discharge opening facing toward the mold 51. Similarly, the fan or blower 64 is mounted at an elevation above that of bed 16, as by a mounting member 66, and oriented to discharge air toward the mold 31.

Arranged over the plate 21, angularly intermediate the stations 11 and 15, is a generally horizontally disposed, substantially rectangular heater 68. The heater is mounted at one corner thereof on an upstanding shaft or rod 69 located radially inward of the plate 21 and supported for rotation about its vertical axis. More particularly, the rod or shaft 69 is mounted for rotation, being supported at its lower end by a thrust bearing 70 carried by a bracket 71 fixed to the frame 10, and is supported at vertically spaced locations by journal bearings 72 and 73 respectively carried by frame members 19 and 20. The heater 68 is fixed to the shaft 69 by suitable mounting means, such as arms 74. In this manner, the horizontally disposed heater is swingable in a horizontal plane between the phantom positions 75 and 76 respectively overlying stations 15 and 11, see FIGURE 1. The vertical elevation of the heater 68 is just slightly above that of the frames 33 and 53 in their closed, operative positions, as may be seen in FIGURES 2 and 3. Thus, the frames 33 and 53 swing about their respective pivotal mountings through the horizontal path of movement of the heater 68, so that if a frame is not in its closed, operative position the heater may not swing into overlying relation with the respective station.

Carried by the heater-mounting shaft 69 may be a spur gear 78 at an elevation below that of the beds 12 and 16. A horizontally disposed cylinder 79 is mounted on the framework 10 at an elevation approximating that of the gear 78, and an extensile and retractile piston rod 80 extends from the cylinder, carrying a toothed rack 81 in meshing engagement with the gear 78. Suitable supports, as at 82 and 83 may be provided for guiding the rack 81 in its longitudinal movement upon extension and retraction of the rod 80. Obviously, actuation of the cylinder 79 to shift the rack 81 effects rotation of the shaft 69 and heater 68 in opposite directions, as between alternate heater positions 75 and 76 and through the intermediate heater position shown in solid lines.

Associated with the cylinder 79 may be a pressure chamber 84, say for compressed air in the case of a pneumatic cylinder, which chamber may be supplied from a compressor 85 driven by a motor 86, through a conduit 87.

For simplicity and ease of understanding, the controls have been largely omitted from FIGURES 1–4, and are diagrammatically represented in FIGURE 5. It is there seen that the cylinder 79 carries the piston rod 80 which shifts the rack 81 to rotate gear 78 and swing the heater. The cylinder is provided with valve means, such as a solenoid valve 90 having a fluid conduit 91 for connection to the pressure tank 84, and a solenoid valve 92 having a fluid conduit 93 for connection to the pressure tank. The valves 90 and 92 are adapted to open into opposite ends of the cylinder 79 for effecting movement of the piston rod 80 in opposite directions. An intermediate limit switch 94 is located medially along the path of movement of rack 81 to be actuated by movement of the rack into an intermediate position with the heater 68 over the plate 21. At opposite ends of the stroke of rack 81 are limit switches 95 and 96 adapted to be actuated by rack motions causing the heater 68 to move respectively over the bed 16 and bed 12. The several switches 94, 95 and 96 are connected to the valves 90 and 92 to close the valves upon actuation of any of the switches, thereby stopping movement of the heater 68. For this purpose, the switches 94, 95 and 96 are provided, respectively, with conductors 97, 98 and 99, which are all connected together, and to valves 90 and 92, as by conductors 100 and 101, to close the valves upon switch actuation by movement of rack 81.

The interlock switches 46 and 60 are respectively connected through conductors 102 and 103 with station-actuating switches 104 and 105. The manually actuable switch 104 of station 15 is connected by a conductor 106 and a conductor 107 to the cylinder valve 90 to open the latter. The conductor 106 is further connected by a conductor 108 to a heater timer 109. The heater timer is in turn connected by a conductor 110 to a conductor 111 which is connected to the valve 92 to open the latter valve. The heater timer 109 is further connected by a conductor 112 to a vacuum and fan timer 113. The vacuum and fan timer are connected by conductors 114 and 115 to the vacuum valve and fan circuit, respectively.

The vacuum and fan blower 113 is further connected by a conductor 116 to a blow-off timer 117 which is in turn connected to a blow-off valve by a conductor 118.

The station 11 has its manually actuable switch 105 connected by a conductor 119 to the conductor 111 to open valve 92; and the conductor 119 is further connected to a conductor 120 which is connected to actuate the heater timer 121 of the station 11. The heater timer 121 is connected by a conductor 122 to the conductor 106, which is further connected by the conductor 107 to the valve 90 to open the latter.

The heater timer 121 is also connected by a conductor 123 to a vacuum and fan timer 124 of the station 11, which is connected by conductors 125 and 126 to a vacuum valve and the fan 63, respectively. The vacuum and fan timer is further connected by a conductor 127 to a blow-off timer 128, which is connected by a conductor 129 to a blow-off valve.

The operation will now be readily understood by the following brief description. In the illustrated position of rack 81, switch 94 is closed to effect closure of valves 90 and 92 so that the gear 78 and heater 68 remain stationary. Of course, the heater 68 remains hot or in its heating condition, being continuously energized, as through conductor means 130, shown in FIGURE 1.

Say an operator initially works at station 15, a sheet of thermoplastic material is placed over the mold 31 and the frame 33 is swung downward and clamped in its closed position. This closes interlock switch 46 so that power may be applied by closing actuating switch 104. Through conductors 106 and 107 valve 90 is opened, as is suitable cylinder-bleed means (not shown) to move rack 81 leftward, as seen in FIGURE 5 until limit switch 95 is engaged by the rack. Such engagement effects closure of valves 91 and 92 to prevent further movement of gear 68, which is now located directly over the station 15. Simultaneously with opening of valve 90, through conductors 106 and 108 the heater timer 109 is energized, and upon timing-out effects opening of valve 92 through conductors 110 and 111 to return the rack 81 rightward to its intermediate position when switch 94 is actuated to close the cylinder valves. Timing-out of heater timer 109 also serves, through conductor 112, to energize vacuum and fan timer 113.

Vacuum and fan timer 113 effect operation of a vacuum valve to evacuate chamber 24 through conduit 29 and draw the heated workpiece against the mold 31. The fan 64 is operated to cool the workpiece in its formed configuration.

Timing-out of the vacuum and fan timer 113 serves to operate the blow-off timer 117 through conductor 116, which actuates a blow-off valve through conductor 118 to apply pressure to the chamber 24 and free the formed workpiece from the mold.

The operator may then open the frame 33 and remove the formed workpiece.

During the automatic heating, vacuum-forming, cooling and blow-off at station 15, the operator has removed a previously formed workpiece from station 11, replaced an unformed workpiece at station 11 and actuated switch 105. This initiates a sequential operation at station 11 identical to that described above in connection with station 15. Thus, a single operator, without changing her location, may operate the instant apparatus at an extremely high rate of production.

While the operating procedure has been described above in connection with vacuum-forming, it is, of course, appreciated that pressure-forming may be employed to achieve the same advantageous results.

From the foregoing, it is seen that the present invention provides a thermoforming apparatus which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. Thermoforming apparatus for operation by a single operator, said apparatus comprising a pair of mold stations disposed in angularly spaced-apart relation for access by an operator from a radially inward position, a mold located at each station, a workholding frame mounted at each station for alternate movement of said frames by an operator into and out of operative association with its adjacent mold, pneumatic means connected to said stations for alternately applying a predetermined forming pressure at respective molds, and heater means mounted for swinging movement along an arcuate path between positions in operative relation with respective stations and through an intermediate position between said stations; whereby a workpiece at each station is adapted to be heated and formed while a finished workpiece is being removed from and a new workpiece replaced at the other station by a single operator.

2. Thermoforming apparatus according to claim 1, said molds each having an upwardly facing mold surface, said workholding frames each being swingable movable out of said arcuate path to move a workpiece into overlying relation with a respective mold and into said arcuate path to move a workpiece out of said overlying relation, and operating means on each frame for effecting manual swinging of the respective frame.

3. Thermoforming apparatus according to claim 2, said heater means being swingable about a generally upright axis between operative positions over respective stations and through an intermediate position over a space between said stations.

4. Thermoforming apparatus according to claim 1, in combination with control means for effecting sequential heater-means movement and pneumatic-means application at each station, and actuating means at each station for actuating said heater-means movement and pneumatic-means application at the respective station.

5. Thermoforming apparatus according to claim 4, said molds each having an upwardly facing mold surface, said workholding frames each being swingable out of said arcuate path to move a workpiece into overlying relation with a respective mold and into said arcuate path to move a workpiece out of said overlying relation, and operating means on each frame for effecting manual swinging of the respective frame, said operating means extending generally radially inward from the respective station.

6. Thermoforming apparatus according to claim 5, in combination with interlock means operatively connected between said operating means and actuating means for preventing accidental actuation of said control means without proper operation of said operating means.

7. Thermoforming apparatus for operation by a single operator, said apparatus comprising a pair of mold stations disposed in angularly spaced-apart relation for access by an operator from a radially inward position, a mold located at each station, a workholding frame mounted at each station for alternate movement of said frames by an operator into and out of operative association with its adjacent mold, pneumatic means connected to said stations for alternately applying a predetermined forming pressure at respective molds, and heater means mounted for swinging movement between positions in operative relation with respective stations and through an intermediate position between said stations; whereby a workpiece at each station is adapted to be heated and formed while a finished workpiece is being removed from and a new workpiece replaced at the other station by a single operator, said mold stations comprising a pair of upwardly facing generally coplanar beds arranged in approximately 90 degree angularly spaced-apart relation, said molds being carried on said beds, said workholding frames each being pivotally mounted on a respective bed at a location radially outward of the carried mold for swinging movement about a generally horizontal axis into and out of overlying relation with the adjacent mold, and operating means on each frame remote from the pivotal mounting thereof for manipulation by an operator, said heater means comprising a generally horizontally disposed heater of a size approximately equal to each of said frames and mounted for its swinging movement about a generally upright axis between operative positions closely overlying each respective frame and an intermediate position over a space between said stations, the path of movement of each frame crossing the path of heater movement to obstruct undesired heater movement.

References Cited

UNITED STATES PATENTS

| | | | |
|---|---|---|---|
| 2,832,094 | 4/1958 | Groth | 18—19 |
| 2,836,852 | 6/1958 | Buttso | 18—19 |
| 3,156,012 | 10/1964 | Hutz | 18—19 |
| 3,179,980 | 4/1965 | Ryan et al. | 18—19 |
| 3,225,387 | 12/1965 | Angilello et al. | 18—19 |

WILLIAM J. STEPHENSON, *Primary Examiner.*